(12) United States Patent
Cardelli

(10) Patent No.: US 8,266,622 B2
(45) Date of Patent: Sep. 11, 2012

(54) DYNAMIC CRITICAL PATH UPDATE FACILITY

(75) Inventor: Marco Cardelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 12/329,809

(22) Filed: Dec. 8, 2008

(65) Prior Publication Data

US 2009/0158287 A1   Jun. 18, 2009

(30) Foreign Application Priority Data

Dec. 18, 2007 (EP) .................................... 07301700

(51) Int. Cl.
*G06F 9/46* (2006.01)
(52) U.S. Cl. ........................ 718/102; 718/103
(58) Field of Classification Search ........................ None
See application file for complete search history.

(56) References Cited

U.S. PATENT DOCUMENTS

| | | | |
|---|---|---|---|
| 5,101,340 A * | 3/1992 | Nonaka et al. | 717/109 |
| 5,893,905 A * | 4/1999 | Main et al. | 705/7.38 |
| 6,665,716 B1 * | 12/2003 | Hirata et al. | 709/224 |
| 2003/0149717 A1 * | 8/2003 | Heinzman | 709/101 |
| 2003/0208470 A1 * | 11/2003 | MacLellan et al. | 707/1 |
| 2005/0275875 A1 * | 12/2005 | Jennings, Jr. | 358/1.15 |
| 2008/0010642 A1 * | 1/2008 | MacLellan et al. | 718/102 |

* cited by examiner

*Primary Examiner* — Eric Coleman
(74) *Attorney, Agent, or Firm* — Nelson and Nelson; Daniel P. Nelson; Alexis V. Nelson

(57) ABSTRACT

A method is presented for dynamically selecting and updating a critical execution path. The method may include receiving a network of jobs for execution. One or more critical jobs may be included in the network of jobs. A job causing a delay in the execution of the network of jobs may be detected, where the job precedes the critical job. A critical path in the network of jobs may then be determined as a function of the job causing a delay. Determination of the critical path may be further based on a slack time associated with jobs in the network that have planned execution times preceding a planned execution time for the critical job.

19 Claims, 4 Drawing Sheets

DYNAMIC CRITICAL PATH UPDATE FACILITY

BACKGROUND

In recent years, computing system complexities have continued to increase, as have interactions between such systems. As a result, the tasks of maintaining and synchronizing such systems have become increasingly complex and cumbersome.

Jobs are routinely scheduled to execute such tasks. Specialized job management systems have been developed to facilitate task performance as computing power and networking grows.

Indeed, successful job management is critical to the maintenance of large computer systems. The favorability of terms negotiated with customers in service level agreements ("SLAs") also depends on successful job management. It is thus critical to ensure that those jobs deemed most important be executed within the correct timeframe. To this end, job management systems aim to generate an accurate job plan taking into account all the parameters which can influence a job's execution.

SUMMARY OF THE INVENTION

Embodiments of the invention have been developed to provide tools and facilities for dynamically selecting and updating a critical execution path.

A method for selecting a critical path in accordance with embodiments of the invention may include receiving a network of jobs for execution. One or more critical jobs may be included in the network of jobs. A job causing a delay in the execution of the network of jobs may be detected, where the job precedes the critical job. A critical path in the network of jobs may then be determined as a function of the job causing a delay. Determination of the critical path may be further based on a slack time associated with jobs in the network that have planned execution times preceding a planned execution time for the critical job.

A corresponding apparatus and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

It will be readily understood that the components of embodiments of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the disclosure, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that embodiments of the invention can be practiced without one or more of the specific details, or with other methods, components, etc. In other instances, well-known structures, or operations are not shown or described in detail to avoid obscuring aspects of the disclosure.

The illustrated embodiments of the invention will be best understood by reference to the drawings, wherein like parts are designated by like numerals throughout. The following description is intended only by way of example, and simply illustrates certain selected embodiments of the invention that are consistent with the disclosure as claimed herein.

Figure 1:
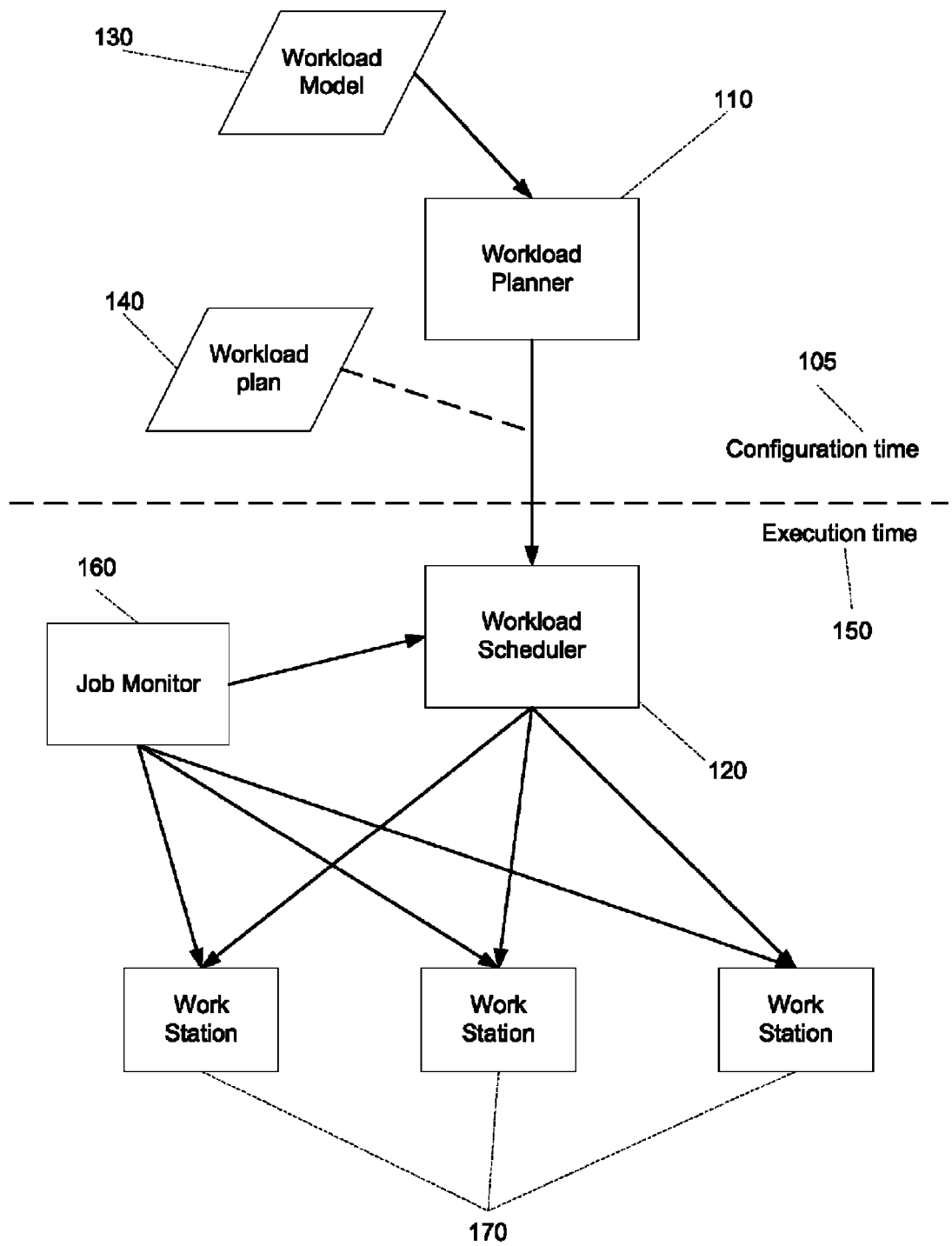
FIG. 1 depicts a system implementing one embodiment of the present invention.

Referring now to FIG. 1, a system suitable for use at configuration time 105 in accordance with one embodiment of the present invention may include a workload planner 110 having as input a workload model 130, and giving as output a workload plan 140.

The system may further include a workload scheduler 120 that receives as input the workload plan 140 from the workload planner 110, a set of workstations 170, and a component for monitoring the jobs 160. The workload scheduler 120 may be used to control the execution of large quantities of jobs in a data processing system. Typically, the workload scheduler 120 controls the execution of jobs in a production period (such as one day) according to a workload plan 140, and dispatches the jobs on various work stations 170.

The workload plan 140 may specify the jobs that should be executed in the production period. Moreover, the workload plan 140 may define a flow of execution of the jobs that satisfies predefined constraints. For this purpose, all the jobs to be controlled by the workload scheduler 120 may be defined in a workload model 130.

The workload model 130 may define static policies of the execution of the jobs. Particularly, the model 130 may set a run-cycle of each job (such as every day, week or month). Moreover, the workload model 130 may indicate temporal constraints that limit when the jobs can be executed. For example, it may be possible to specify that the jobs have an earliest time or a deadline for their execution, or a maximum allowable duration. The workload model 140 may also indicate resource constraints that identify resources being required for the execution of the jobs. In one embodiment, for example, it may be possible to specify that the availability of specific information, software programs, or hardware devices is a prerequisite for the execution of the jobs. The model 130 may also indicate dependency constraints, which define conditions that must be met before submitting the jobs for execution. In another embodiment, for example, it may be possible to specify that jobs may be submitted only after the successful completion of other jobs.

The workload planner 110 may access the model before every production period to construct the workload plan 140 accordingly. Particularly, the workload planner 110 may add all the jobs to be executed in the production period to the plan 140. The jobs may then be arranged in the plan 140 so as to satisfy the corresponding constraints, such as temporal constraints, resource constraints, and/or dependency constraints. The constraints which may be associated with a job will be described in more detail with respect to FIG. 2 below.

Some of the jobs in the plan 140 may be marked as critical due to their role in ensuring that tasks needed to satisfy terms in SLA agreements are completed by their expected deadlines. It may then be important to detect conditions that may prevent this from happening. Such conditions may be detected at a time sufficient to allow automatic or manual recovery. As these jobs may be part of the workload plan 140 and may be dependent on other jobs, it may be important to identify a critical path in the network of jobs 140. Such a critical path may be identified to favor those jobs required to meet critical jobs' deadlines.

The critical path for a given job (the critical job) in a network of job dependencies may be defined as the most critical chain of dependent jobs among all its predecessors, i.e. the most risky path in order to meet the critical job deadline. Paths in a network of jobs will be described more in detail with respect to FIG. 3 below.

The workload planner 110, during the plan generation phase 105, may determine the critical path in the network of the predecessors of the critical job. The critical job's predecessors may be successfully completed for the critical job to start executing. The critical path may be defined as the path among all the critical job predecessors with the lowest slack time. Particularly, the algorithm implemented to calculate the path may start from a critical job and, proceeding backwards through the predecessors' chain, may identify the most critical predecessor by choosing the job with the latest planned end time. The planned end time may be calculated by taking into consideration all the scheduling objects that can interact with the job itself, such as dependencies on other jobs, dependencies on special resources, workstations open intervals, deadlines, and so on. A job's slack time will be described more in detail with respect to FIG. 2 below.

The critical path may thus be computed at configuration time 105, upon generation of the workload plan 140. Several conditions may occur, however, that may make the critical path invalid at execution time 150. For instance, the customer may modify the plan, jobs may be deleted from or added to the critical jobs network, or other changes may be made that have an impact on the critical path. Such changes may include, for example, modified dependencies, resources, re-run jobs ended in error, and so on. It may thus be important to determine the critical path at execution time 150, when certain events are detected which make it likely for the critical path to have become invalid. The method to determine the critical path at execution time 150 will be described more in detail with respect to FIG. 4 below.

The job monitor component 160 may thus monitor the jobs executions on the different workstations 170 to detect events which may require an update of the critical path. The job monitor component 160 may also interact with the workload scheduler 120 to trigger a new computation of the critical path.

In the workload plan 140, one or several jobs may be marked as critical, with a corresponding critical path for each critical job. The same method may then be independently applied to each critical path.

Figure 2:
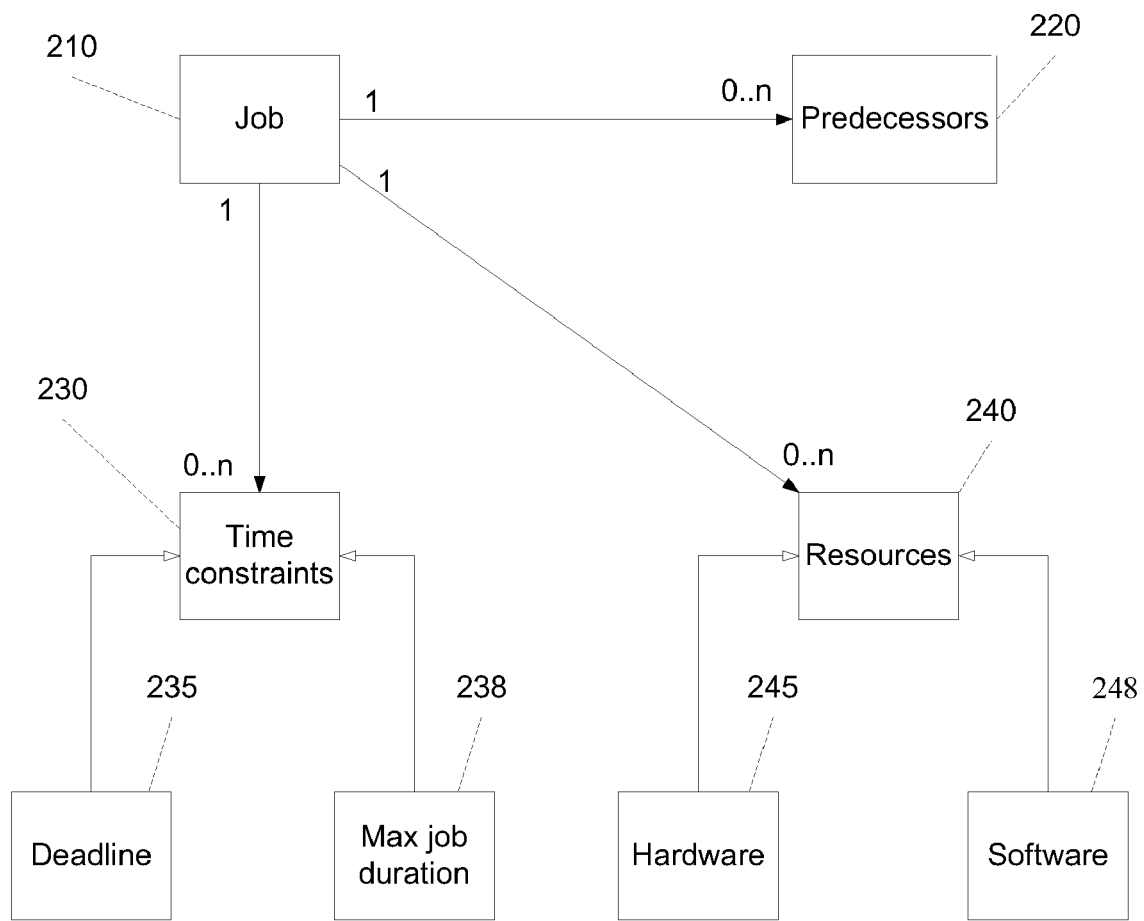
FIG. 2 depicts a data model illustrating relationships between different components of embodiments of the present invention.

Referring now to FIG. 2, a data model showing relationships between different components of embodiments of the present invention may include a job 210, a set of job predecessors 220, a set of time constraints 230, which may include a deadline 235 or a maximum duration 238, and a set of needed resources 240, which may include hardware 245 or software 248 resources.

Each job may be associated with various characteristics that may be used as parameters for planning its execution in the workload plan 140. A job 210 may have any number of predecessors 220. Such predecessors must generally be successfully completed for the job 210 execution to start. In some embodiments, a job 210 may also require certain resources to be available when it is executed, such as information, a software application, or hardware device.

A job 210 may also have certain time constraints 230, such as a deadline which represents the latest possible end time for a job. As shown in FIG. 1, a deadline 238 may be important in the case of a critical job. A job 210 may also have a maximum execution duration 238, which may be monitored by the monitoring component 160 at execution time 150.

A job planned start time may be computed as the difference between the job deadline 235 and the job maximum duration 238. A job planned start time is not the latest time by which a job can start, as this would be too risky. Instead, there is some buffer between the planned start time and the latest start time. In general, a job does not need its maximum duration time 238 to execute. As a consequence, most of the time a job will complete before its deadline is met. This difference is called the slack time, and is defined as the job estimated duration subtracted from the difference between the job deadline and the job planned start time. The shorter the slack time, the greater the risk that the job's deadline 235 may be missed if there is a problem. The latest start time may thus correspond to a slack time equal to zero.

Figure 3:
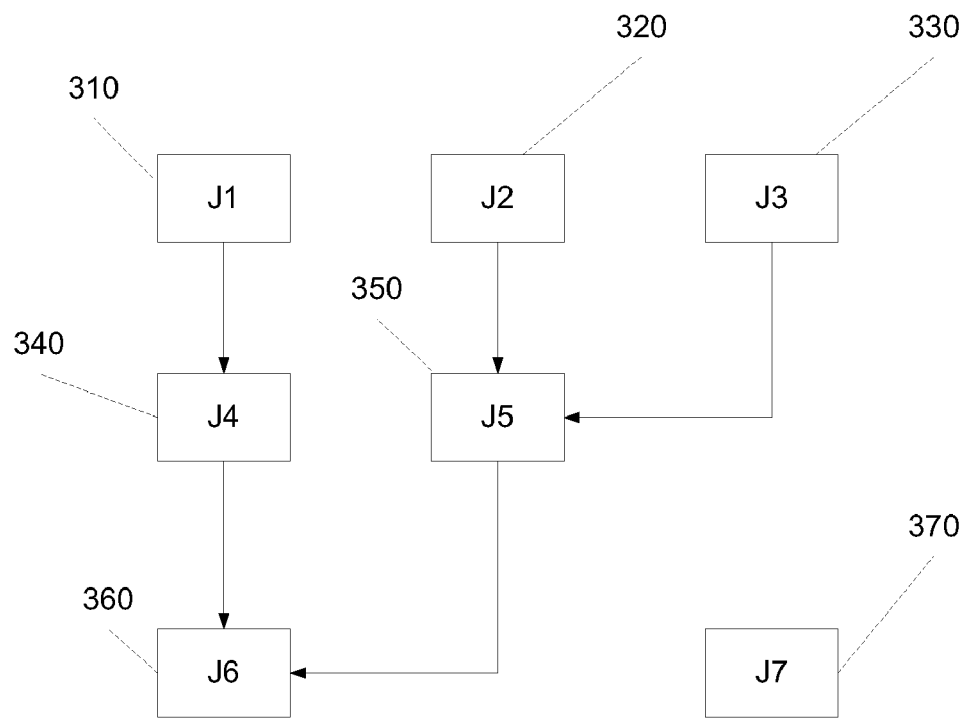
FIG. 3 illustrates an exemplary network of jobs in one embodiment of the present invention.

FIG. 3 depicts an example of a network of jobs in accordance with certain embodiments of the invention. The network of jobs may include a job J1 310 which is a predecessor of a job J4 340, a job J2 320 and a job J3 330 which are predecessors of a job J5, a job J6 360 having J4 340 and J5 350 as predecessors, and a job J7 370 that is independent.

If the job J6 360 is marked as critical, then the computation of the critical path may be done among all J6 360 predecessors. Different execution flows among all the predecessors are possible, such as J1 310, J4 340, J2 320, J3 330, J5 350, and J6 360, or J1 310, J3 330, J4 340, J2 320, J5 350, and J6 360. The critical path may differ depending on the execution flow defined in the workload plan 140. The path corresponding to J1 310, J4 340 may be identified as critical, rather than the path J2 320, J3 330, J5 350, even if the latter includes more jobs.

Any of the jobs that are predecessors to a critical job may potentially produce a change to the critical path during plan execution, if such job causes a delay during the plan execution. Such a delay may be due to, for example, the job being late, i.e. it cannot start by its latest start time, or the last time the job can start to meet its deadline. In other cases, delays may be caused by jobs ending in error, or by jobs becoming long running, such that their execution takes longer than the estimated duration.

Update of the critical path during execution time 150 will be described in more detail with respect to FIG. 4 below. To allow effective automatic and manual recovery actions, however, the critical path recalculation may be triggered as early as possible.

Figure 4:
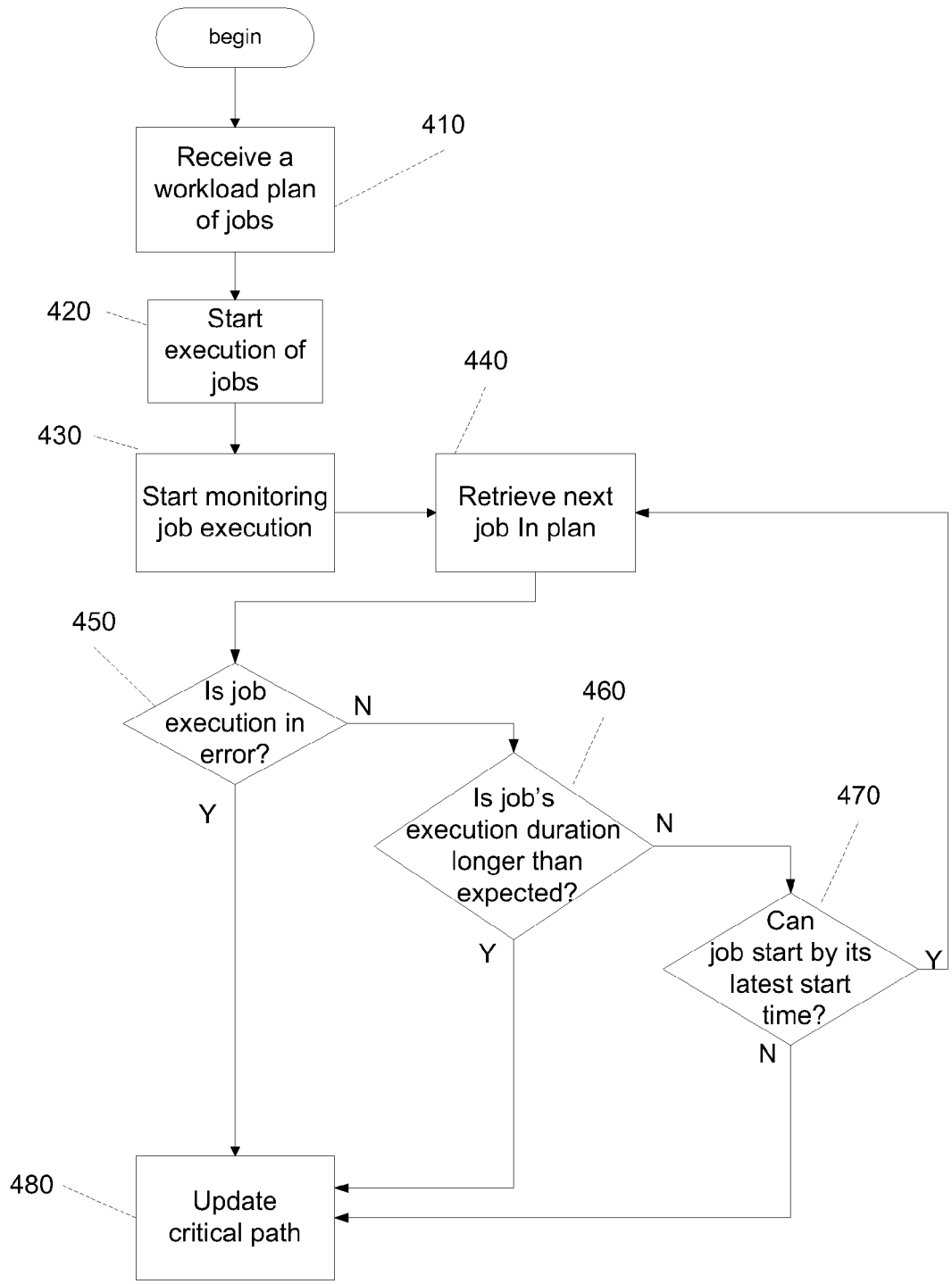
FIG. 4 shows a high-level process for updating a critical path in a network of jobs at execution time in accordance with certain embodiments of the present invention.

FIG. 4 shows a high-level process for updating a critical path in a network of jobs at execution time in one embodiment of the present invention. The process may include receiving a workload plan of jobs 410, starting the execution of jobs 420, and starting to monitor the job executions 430.

For each job in the network of jobs whose execution is not yet successfully completed 440, the process may further include checking whether the job execution is in error 450. If not, it may be determined whether the job's actual execution duration is longer than the estimated duration 460. If not, it maybe determined whether the job can start by its latest start time 470. If the job cannot start by its latest start time 470, the process may pass to the next job in plan 440.

When a problem is detected at any of the steps 450, 460 or 470, the critical path 480 may be updated. By monitoring all the late 470, ended in error 450, and long running 460 predecessors to a critical job, it may be possible to detect, during the plan execution, a network path which may be more critical than that calculated during plan generation.

When a critical job predecessor hits one of the above conditions, the remaining slack time may be determined for its worst path to the critical job. This may indicate that the critical path should be recalculated. After the remaining slack time expires, if the condition that affected the job has not changed, that is, the job has not started, is still in error or still executing, all its successors' planned start and end times may be adjusted based on the current delay. The critical path may then be computed again, applying the same algorithm used during the planning phase, i.e. visiting the critical job predecessors graph and making a path by always choosing the predecessor job with the latest planned end time.

Alternatively, the monitoring component 160 may be limited to monitoring only the late jobs 470 in the network of the critical job predecessors, as such monitoring may indirectly include jobs ended in error and long running. Indeed, these underlying problems in the critical job predecessors may be indicated by their successors being late 470.

Another embodiment may include a method for dynamically updating a critical path in a network of jobs. The critical path may be dynamically updated in response to detecting an unexpected delay during execution of a predecessor job. In some cases, for example, the job causing the delay may be a job that cannot start by a latest start time associated therewith 470, a job that is in error 450, or a job that has an actual execution duration longer than its estimated duration 460.

The invention can take the form of an entirely hardware embodiment, an entirely software embodiment or an embodiment containing both hardware and software elements. In one embodiment, the invention may be implemented in software, which may include but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium may include a semiconductor or solid state memory, magnetic tape, a removable computer diskette, a random access memory ("RAM"), a read-only memory ("ROM"), a rigid magnetic disk and an optical disk. Current examples of optical disks include compact disk-read only memory ("CD-ROM"), compact disk-read/write ("CD-R/W") and DVD.

A data processing system suitable for storing and/or executing program code may include at least one processor coupled directly or indirectly to memory elements by a system bus. The memory elements may include local memory employed during actual execution of the program code, bulk storage, and cache memories which provide temporary storage of at least some program code to reduce the number of times code must be retrieved from bulk storage during execution.

Input/output or I/O devices (including but not limited to keyboards, displays, pointing devices, etc.) may be coupled to the system either directly, or through intervening I/O controllers.

Network adapters may also be coupled to the system to enable the data processing system to become coupled to other data processing systems, remote printers, or storage devices through intervening private or public networks. Modems, cable modem and Ethernet cards are just a few of the currently available types of network adapters.

The invention claimed is:

1. A method for dynamically selecting a critical execution path in a network of jobs, the method comprising:
   receiving a network of jobs for execution, the network of jobs comprising a critical job having a completion deadline and a plurality of predecessor jobs that need to be completed prior to completing the critical job;
   determining a workload plan for executing the network of jobs to enable the critical job to complete by the completion deadline;
   including, in the workload plan, a planned start time and a latest start time for each predecessor job of the plurality of predecessor jobs;
   determining a critical path through the network of jobs by finding a path through the predecessor jobs with a lowest slack time;
   detecting, by at least one processor during execution of the network of jobs, whether a predecessor job did not start in time to meet its latest start time specified in the workload plan; and
   recalculating the critical path in the event the predecessor job did not start in time to meet its latest start time.

2. The method of claim 1, further comprising including, in the workload plan, an estimated duration time for each predecessor job of the plurality of predecessor jobs.

3. The method of claim 2, further comprising determining, during execution of the network of jobs, whether a predecessor job of the plurality of predecessor jobs took longer than its estimated duration time to complete.

4. The method of claim 1, further comprising recalculating the critical path in the event a predecessor job from the plurality of predecessor jobs took longer than its estimated duration time to complete.

5. The method of claim 1, further comprising determining whether execution of a predecessor job from the plurality of predecessor jobs resulted in error.

6. The method of claim 5, further comprising recalculating the critical path in the event execution of a predecessor job from the plurality of predecessor jobs resulted in error.

7. An apparatus for dynamically selecting a critical execution path, the apparatus comprising:
   at least one processor;
   at least One memory device coupled to the at least one processor and storing computer instructions for execution on the at least one processor, the computer instructions enabling the at least one processor to:
receive a network of jobs for execution, the network of jobs comprising a critical job having a completion deadline and a plurality of predecessor jobs that need to be completed prior to completing the critical job;
determine a workload plan for executing the network of jobs to enable the critical job to complete by the completion deadline;
include, in the workload plan, a planned start time and a latest start time for each predecessor job of the plurality of predecessor jobs;
determine a critical path through the network of jobs by finding a path through the predecessor jobs with a lowest slack time;
detect, during execution of the network of jobs, whether a predecessor job did not start in time to meet its latest start time specified in the workload plan; and
recalculate the critical path in the event the predecessor job did not start in time to meet its latest start time.

8. The apparatus of claim 7, wherein the computer instructions further enable the at least one processor to include, in the workload plan, an estimated duration time for each predecessor job of the plurality of predecessor jobs.

9. The apparatus of claim 8, wherein the computer instructions further enable the at least one processor to determine, during execution of the network of jobs, whether a predecessor job of the plurality of predecessor jobs took longer than its estimated duration time to complete.

10. The apparatus of claim 9, wherein the computer instructions further enable the at least one processor to recalculate the critical path in the event a predecessor job from the plurality of predecessor jobs took longer than its estimated duration time to complete.

11. The apparatus of claim 7, wherein the computer instructions further enable the at least one processor to determine whether execution of a predecessor job from the plurality of predecessor jobs resulted in error.

12. The apparatus of claim 11, wherein the computer instructions further enable the at least one processor to recalculate the critical path in the event execution of a predecessor job from the plurality of predecessor jobs resulted in error.

13. The apparatus of claim 7, wherein the computer instructions further enable the at least one processor to receive a workload model and determine the critical path based on the workload model.

14. A computer program product for dynamically selecting a critical execution path, the computer program product comprising a non-transitory computer-readable storage medium having computer-usable program code stored therein the computer-usable program code comprising:
computer-usable program code to receive a network of jobs for execution, the network of jobs comprising a critical job having a completion deadline and a plurality of predecessor jobs that need to be completed prior to completing the critical job;
computer-usable program code to determine a workload plan for executing the network of jobs to enable the critical job to complete by the completion deadline;
computer-usable program code to include, in the workload plan, a planned start time and a latest start time for each predecessor job of the plurality of predecessor jobs;
computer-usable program code to determine a critical path through the network of jobs by finding a path through the predecessor jobs with a lowest slack time;
computer-usable program code to detect, during execution of the network of jobs, whether a predecessor job did not start in time to meet its latest start time specified in the workload plan; and
computer-usable program code to recalculate the critical path in the event the predecessor job did not start in time to meet its latest start time.

15. The computer program product of claim 14, further comprising computer-usable program code to include, in the workload plan, an estimated duration time for each predecessor job of the plurality of predecessor jobs.

16. The computer program product of claim 15, further comprising computer-usable program code to determine, during execution of the network of jobs, whether a predecessor job of the plurality of predecessor jobs took longer than its estimated duration time to complete.

17. The computer program product of claim 16, further comprising computer-usable program code to recalculate the critical path in the event a predecessor job from the plurality of predecessor jobs took longer than its estimated duration time to complete.

18. The computer program product of claim 14, further comprising computer-usable program code to determine whether execution of a predecessor job from the plurality of predecessor jobs resulted in error.

19. The computer program product of claim 18, further comprising computer-usable program code to recalculate the critical path in the event execution of a predecessor job from the plurality of predecessor jobs resulted in error.

* * * * *